March 23, 1965  J. P. FRANCIS  3,174,536
FRAME SUPPORTING MEANS FOR AUTOMOBILE WINDSHIELD AWNING
Original Filed Feb. 14, 1961
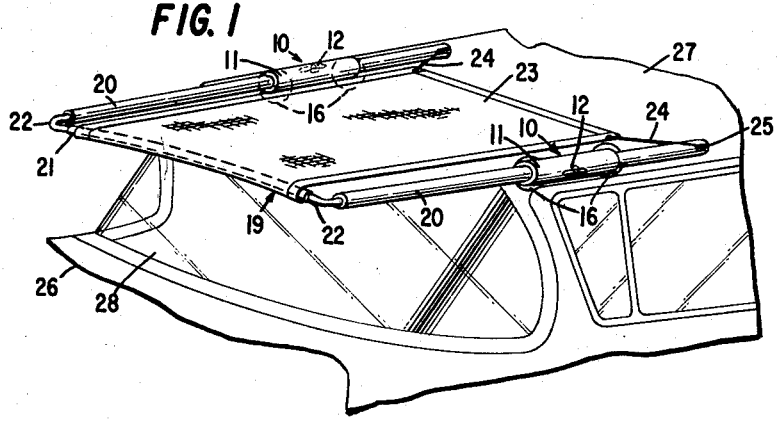
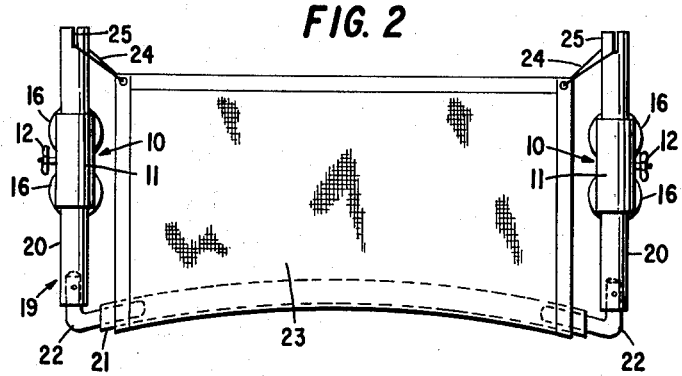
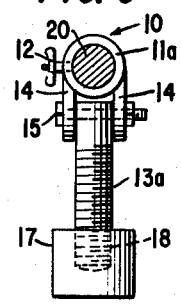
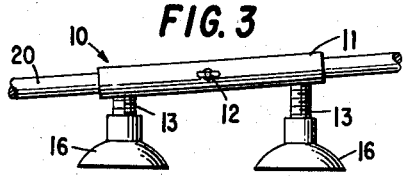
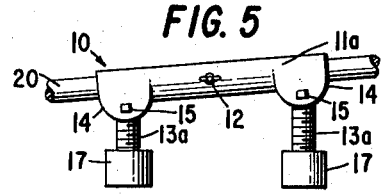
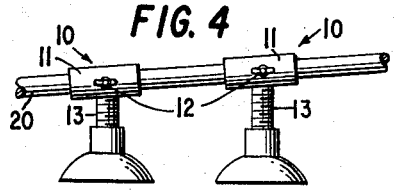
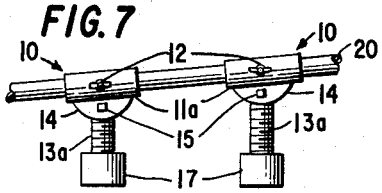
INVENTOR
John P. Francis United States Patent Office 3,174,536
Patented Mar. 23, 1965

1

3,174,536
FRAME SUPPORTING MEANS FOR AUTOMOBILE
WINDSHIELD AWNING
John P. Francis, 20 Boston St., Haverhill, Mass.
Original application Feb. 14, 1961, Ser. No. 89,608, now
Patent No. 3,131,755, dated May 5, 1964. Divided
and this application Feb. 11, 1964, Ser. No. 352,707
2 Claims. (Cl. 160—369)

This application is a division of my copending application, Serial No. 89,608, filed February 14, 1961, now Patent No. 3,131,755, for Frame Supporting Means for Automobile Windshield Awning.

This invention relates to improvements in the supporting means for supporting a retractable awning structure over the windshield area and the roof top of an automobile, an object thereof being to provide a very simple and an improved awning or frame supporting means adapted to adjustably engage the exterior portion of the roof top of said automobile.

Another object thereof is to provide a permanent, semi-permanent, or temporary and removable roof engaging awning supporting means capable of also supporting the awning in a like manner of attachment.

A still further object thereof is to provide a flexible taut supported awning capable of being supported for retractable movement and longitudinally angular and vertical adjustment in the same taut supported form, over the roof top of the automobile.

A still further and important object thereof is to provide weather protection to the windshield area from rain, sleet, snow, or the formation of ice thereon, and to provide clean and clear visibility for proper vision at all times when viewing outdoor movies at drive-in theatres and other outdoor events, thereby eliminating the continuous or the on and off use of the windshield wipers.

With these objects and still others in view, as will hereinafter more fully appear, the invention comprises certain novel constructions, combination and arrangement of parts, hereinafter described and claimed and illustrated in the accompanying drawings, in which:

FIGURE 1 is a perspective view, in fragment, of the front portion of an automobile, the view including a perspective view of the awning and the supporting means for supporting the frame structure and said awning.

FIGURE 2 is a top plan view of the awning shown attached to the frame structure and supported by the frame supporting means.

FIGURE 3 is a side elevation view of the awning or frame supporting means shown adjustably supporting a side longitudinal frame member.

FIGURE 4 is a side elevation view of the awning or frame supporting means, a modified form showing two separate members for adjustably supporting a side longitudinal frame member.

FIGURE 5 is a side elevation view of a modified form of the awning or frame supporting means supported by the magnetized metal base member.

FIGURE 6 is an end elevation view of the modified form of frame supporting means of FIGURE 5; and FIGURE 7 is a side elevation view of the modified form of frame supporting means, showing two separate members for adjustably supporting a side longitudinal frame member.

Referring now more specifically to the drawings, attention is directed primarily to FIGURES 1 and 2, wherein numeral 10 generally indicates the awning or frame supporting means and numeral 19 generally indicates the frame structure supported therefrom.

In FIGURE 1, a portion of an automobile 26 is shown with the awning 23, which is made of flexible or of rigid material, being supported by the frame structure 19 over the roof top 27 and the windshield area 28, and adjustably supported for longitudinal angular pivotal adjustment of said awning.

To support the frame structure 19, first, the frame supporting means 10 are either removably or permanently attached to the roof top 27 at the desired location, laterally and longitudinally, as may be noted from FIGURE 1.

The awning or frame supporting means 10, FIGURE 3, has a longitudinal tubular member 11 to adjustably support a retractable side longitudinal frame member 20 therefrom. A vertically disposed threaded member 13 extends from each end portion of tubular member 11 to adjustably engage each flexible suction cup 16, and to provide longitudinal angular pivotal adjustment of tubular member 11 upon the vertical adjustment of one of the two said vertical threaded members 13. A thumb screw 12 is provided on tubular member 11, and also modified tubular member 11a, to adjustably secure the side longitudinal frame member 20 of the frame structure 19.

In FIGURE 4, a modified arrangement of FIGURE 3 is shown, wherein two separate frame supporting means 10 are used to adjustably support a side longitudinal frame member 20 of frame structure 19 for the various positions of adjustment thereof.

In FIGURE 5, there is shown a modified form of the frame supporting means 10. The longitudinal member 11a thereof has ears or lugs 14 depending therefrom substantially as shown. Pivotally attached, by a bolt and nut member 15, to each pair of ears or lugs 14 is a vertically disposed threaded member 13a. The lower threaded portion of vertical member 13a is adjustably engaged within the threaded recess 18, FIGURE 6, of a magnetized metal block 17. The magnetized metal base member 17 engages the roof top 27 in the desired location for supporting the awning structure over the roof top and the windshield area of the vehicle.

Frame supporting means and a modification of a frame and awning structure are shown and described in my copending application, Serial No. 762,733, filed September 23, 1958, now Patent No. 2,984,300. My invention therefore, is concerned primarily with the improved forms of frame supporting means for providing additional adjustment and support for the awning structure and without any other additional element to provide said adjustment and support.

Referring back to FIGURES 5, 6 and 7, flexible pivotal adjustment of the vertical threaded member 13a is provided by the bolt member 15 which freely engages the upper portion of said vertical threaded member 13a to the ears or lugs 14. In FIGURES 3 and 4, flexible supporting engagement of the vertical threaded member 13 is provided by the said vertical threaded member 13 adjustably engaging the flexible suction cup 16. Flexible supporting adjustment is provided when one of the vertical threaded members 13 is raised or lowered in a greater portion than the other mated threaded member of the same side, thus providing a higher degree of longitudinal angularity of the longitudinal tubular member 11.

The retractable frame structure 19 is provided with longitudinal side frame members 20 having angled corner members 22 attached thereto and engaging the outer lateral member 21 to form the frame structure 19. The rear end portions of the longitudinal side frame members 20 are each provided with an aperture 25, said apertures 25 engaging the rear corner awning supporting members 24. The frame structure 19 and the awning structure 23, as shown and described, may be of other structural modifications and adjustably supported in a like manner by the frame supporting means 10 for the various positions of adjustment.

Frame supporting means 10, FIGURES 3 and 4, and also FIGURES 5 and 6, provide vertical adjustment of the awning structure 23 upon the vertical adjustment of two, or all of the vertical threaded members 13, or embodiment 13a. Longitudinal angular adjustment of the awning structure 23 is provided upon the vertical adjustment of either the two forward, or the two rear vertical threaded members 13, or embodiment 13a. The awning 23 may be supported in either spaced apart relationship or in lateral rain sealing engagement with the roof top upon the vertical adjustment of the vertical threaded members 13 or 13a, accordingly, to obtain the desired positioning of the awning 23 in relation to the roof top and the angle and the force of the falling precipitation, while viewing outdoor movies or the like during inclement weather conditions.

It is quite obvious that the embodiment 11a, of FIGURES 5, 6 and 7, may also be erected on opposite sides of the roof top of the vehicle, in spaced apart pairs, to support each side longitudinal frame member 20 of the frame structure 19, as shown in FIGURE 7 of the drawing.

The paired vertical threaded members 13, or 13a, on each side of the roof top, provides a very stable as well as an adjustable support for the frame structure 19 and attached awning 23.

The simplicity in the structure and in the application of the frame supporting means, in providing a means of adjustable support for supporting a retractable awning in any desired position, may readily be seen. The awning therefore, is fully retractable and extendable in a taut supported panel form over the roof top and the windshield area. Furthermore, the awning may be supported in friction supporting engagement with the roof top, or in rain sealing engagement, or in spaced apart relationship relative to the lateral contour of the said roof top of the automobile.

Therefore, clear and total windshield visibility is obtained without any on or off or continuous automobile engine noise, or windshield wiper noise or blur, or windshield wiper or engine noise caused by the automobile or the adjacent parked automobiles, in a drive-in threatre, while viewing outdoor movies or the like during inclement weather.

While certain embodiments of my invention have been disclosed in the foregoing description, it will be understood that various modifications may occur to those skilled in the art. Changes, therefore, in the construction and arrangement, may be made without departing from the spirit and scope of the invention as disclosed in the appended claims.

I claim:

1. An adjustable automobile awning frame supporting means for adjustably supporting a removably attached windshield awning and frame structure, comprising longitudinally spaced apart side longitudinal tubular supports for supporting in longitudinally movable adjustment therethrough a removably attached side longitudinal frame member of said frame structure, each of the said longitudinal tubular supports being of a substantial length for vertically movable support by a vertically disposed threaded stud member extending downwardly and directly from the underside of the outer periphery of each of the said longitudinal tubular supports and spaced from each end of the said supports, said threaded stud members adapted to support the said side longitudinal tubular supports in an adjustable longitudinally angular or vertically movable position upon solely an upward and downward movement of either one or both of the said longitudinally spaced apart vertical threaded stud members, and roof engaging means threadably engaging and adjustably supporting the said spaced apart vertical threaded stud members thereto for the said individual vertical movement of either one or both of the said vertical threaded stud members therein upon solely the adjustable axial rotation of the said roof engaging means in providing a pre-selected supporting position of the said side longitudinal tubular frame supports, said adjustable frame supporting means adapted to be pre-attached to the roof top to adjustably support the attachable awning and frame structure in lateral frictional rain sealing engagement with the roof top or in adjustable longitudinally angular or horizontally positioned spaced apart relationship relative to the roof top and the windshield area of the automobile depending upon the supporting position of the said longitudinal tubular supports.

2. An adjustable automobile awning frame supporting means for adjustably supporting a removably attached windshield awning and frame structure as defined in claim 1, and including a vertical member extending downwardly from each longitudinal tubular support, and a horizontally disposed member extending through the said vertical member and the stud member to provide longitudinally movable pivotal support of each longitudinally spaced vertical threaded stud member in providing longitudinally angular adjustment of said side longitudinal tubular supports.

References Cited by the Examiner

UNITED STATES PATENTS

| | | | |
|---|---|---|---|
| 2,440,821 | 5/48 | Godwin | 224—42.1 |
| 2,480,353 | 8/49 | Bjork | 224—42.1 |
| 2,594,319 | 4/52 | Law | 224—42.1 |
| 2,621,836 | 12/52 | McMiller | 224—42.1 |
| 2,698,119 | 12/54 | Cicogna | 224—42.1 |
| 2,812,208 | 11/57 | Francis | 160—368 |

FOREIGN PATENTS 149,955   12/31   Switzerland.

CHARLES E. O'CONNELL, *Primary Examiner.*

HARRISON R. MOSELEY, *Examiner.*